United States Patent
Mizuno et al.

(10) Patent No.: US 11,329,281 B2
(45) Date of Patent: May 10, 2022

(54) MAGNESIUM-SULFUR SECONDARY BATTERY POSITIVE ELECTRODE, METHOD FOR PRODUCING SAME, AND MAGNESIUM-SULFUR SECONDARY BATTERY

(71) Applicant: MURATA MANUFACTURING CO., LTD., Kyoto (JP)

(72) Inventors: Yoshifumi Mizuno, Kyoto (JP); Yuri Nakayama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 251 days.

(21) Appl. No.: 16/600,014

(22) Filed: Oct. 11, 2019

(65) Prior Publication Data
US 2020/0044244 A1     Feb. 6, 2020

Related U.S. Application Data

(63) Continuation of application No. PCT/JP2018/015250, filed on Apr. 11, 2018.

(30) Foreign Application Priority Data

Apr. 14, 2017  (JP) ............................. JP2017-080606

(51) Int. Cl.
*H01M 4/136* (2010.01)
*H01M 10/63* (2014.01)
(Continued)

(52) U.S. Cl.
CPC ............ *H01M 4/366* (2013.01); *H01M 4/38* (2013.01); *H01M 4/625* (2013.01); *H01M 4/74* (2013.01);
(Continued)

(58) Field of Classification Search
None
See application file for complete search history.

(56) References Cited

U.S. PATENT DOCUMENTS

| | | | | |
|---|---|---|---|---|
| 2014/0212703 A1* | 7/2014 | Kobori | ................. | H01M 4/364 429/7 |
| 2014/0220450 A1* | 8/2014 | Jilek | ....................... | C25D 3/42 429/300 |

FOREIGN PATENT DOCUMENTS

| | | |
|---|---|---|
| EP | 3279141 A1 | 2/2018 |
| JP | 2015227438 A | 12/2015 |
| WO | 2016159212 A1 | 12/2017 |

OTHER PUBLICATIONS

Yu et al., Performance Enhancement and Mechanistic Studies of Magnesium-Sulfur Cells with an Advanced Cathode Structure, ACS Energy Letters, 431-37 (Jul. 27, 2016) (Year: 2016).*

(Continued)

*Primary Examiner* — Yoshitoshi Takeuchi
(74) *Attorney, Agent, or Firm* — K&L Gates LLP

(57) ABSTRACT

Provided is a magnesium-sulfur secondary battery including a positive electrode that includes a carbon material layer and a laminated structure of a positive electrode active material layer including sulfur or a sulfur compound; an electrolyte layer; and a negative electrode. In the magnesium-sulfur secondary battery, the positive electrode active material layer, the carbon material layer, and the electrolyte layer are provided in this order, and the positive electrode active material layer and the carbon material layer are in contact with each other.

11 Claims, 7 Drawing Sheets

(51) Int. Cl.
  *H01M 10/633* (2014.01)
  *H01M 10/635* (2014.01)
  *H01M 50/244* (2021.01)
  *H01M 4/36* (2006.01)
  *H01M 4/38* (2006.01)
  *H01M 4/62* (2006.01)
  *H01M 4/74* (2006.01)
  *H01M 10/054* (2010.01)
  *H01M 10/0585* (2010.01)
  *H01M 4/02* (2006.01)

(52) U.S. Cl.
  CPC ..... *H01M 10/054* (2013.01); *H01M 10/0585* (2013.01); *H01M 2004/028* (2013.01)

(56) References Cited

OTHER PUBLICATIONS

Japanese Office Action issued Dec. 1, 2020 in corresponding Japanese Application No. 2019-512553.
Xingwen Yu et al., "Performance Enhancement and Mechanistic Studies of Magnesium-Sulfur Cells with an Advanced Cathode Structure", ACS Energy Letters, vol. 1, Issue 2, pp. 431-437, Jul. 27, 2016.
Sheng-Heng Chung et al., "High-Performance Li-S Batteries with an Ultra-lightweight MWCNT-Coated Separator", The Journal of Physical Chemistry Letters, vol. 5, Issue 11, pp. 1978-1983, May 21, 2014.
International Search Report for Application No. PCT/JP2018/015250, dated Jul. 10, 2018.

\* cited by examiner

MAGNESIUM-SULFUR SECONDARY BATTERY POSITIVE ELECTRODE, METHOD FOR PRODUCING SAME, AND MAGNESIUM-SULFUR SECONDARY BATTERY

CROSS REFERENCE TO RELATED APPLICATIONS

The present application is a continuation of PCT patent application no. PCT/JP2018/015250, filed on Apr. 11, 2018, which claims priority to Japanese patent application no. JP2017-080606 filed on Apr. 14, 2017, the entire contents of which are being incorporated herein by reference.

BACKGROUND

The present disclosure generally relates to a magnesium-sulfur secondary battery positive electrode, a method for producing the same, and a magnesium-sulfur secondary battery.

One of the major challenges for the practical application of magnesium-sulfur secondary batteries is to improve cycle characteristics. The main cause of cycle characteristics degradation in magnesium-sulfur secondary batteries is that an active material: sulfur or polysulfide is desorbed (or eluted) from a positive electrode during a charge-discharge reaction, a conductive path is lost, and the active material is inactivated. As one approach for improving the cycle characteristics of magnesium-sulfur secondary batteries, the use of a sulfur-carbon composite positive electrode widely used in the field of lithium-sulfur secondary batteries has been reported, however, the improvement in the cycle characteristics has not been achieved.

SUMMARY

The present disclosure generally relates to a magnesium-sulfur secondary battery positive electrode, a method for producing the same, and a magnesium-sulfur secondary battery.

However, according to the study by the present inventors, it has been found that the improvement of cycle characteristics in the conventional technology is insufficient.

Therefore, an object of the present disclosure is to provide a magnesium-sulfur secondary battery having excellent cycle characteristics, a magnesium-sulfur secondary battery positive electrode that is suitable for use in the magnesium-sulfur secondary battery, and a method for producing the magnesium-sulfur secondary battery positive electrode.

According to an embodiment of the present disclosure, a positive electrode for a magnesium-sulfur secondary battery includes a laminated structure including a positive electrode active material layer and a carbon material layer. The positive electrode active material layer includes sulfur or a sulfur compound.

According to an embodiment of the present disclosure, a magnesium-sulfur secondary battery includes:
a positive electrode including a laminated structure having a positive electrode active material layer and a carbon material layer; an electrolyte layer; and a negative electrode. The positive electrode active material layer includes sulfur or a sulfur compound.

According to an embodiment of the present disclosure, a method for producing a positive electrode for a magnesium-sulfur secondary battery includes a method for producing a magnesium-sulfur secondary battery positive electrode including a laminated structure having a carbon material layer and a positive electrode active material layer including sulfur or a sulfur compound and meshes including a metal or an alloy, the method including:
sandwiching the laminated structure between the meshes; and
pressure-bonding the positive electrode active material layer and the carbon material layer by applying a pressure to a whole of the meshes and the laminated structure.

In the magnesium-sulfur secondary battery positive electrode of the present disclosure or the magnesium-sulfur secondary battery of the present disclosure, since the positive electrode includes a laminated structure formed by laminating a positive electrode active material layer and a carbon material layer, interaction occurs between sulfur or a sulfur compound and the carbon material layer during charging (for example, sulfur or the sulfur compound is trapped in the carbon material layer, or alternatively, sulfur or the sulfur compound repels the carbon material layer, and movement of sulfur or the sulfur compound is inhibited). Consequently, it is estimated that the utilization rate of sulfur or the sulfur compounds will be improved, and thus the cycle characteristics of the magnesium-sulfur secondary battery will be dramatically improved. Further, in the method for producing a magnesium-sulfur secondary battery positive electrode of the present disclosure, the positive electrode active material layer and the carbon material layer are pressure-bonded, whereby leakage of sulfur or the sulfur compound can be eliminated as much as possible. As a result, cycle deterioration is expected to be significantly suppressed, and it is estimated that a very high capacity retention rate is exhibited even after the charge-discharge cycle has elapsed. Note that the effects described in the present specification are just illustrative and the present disclosure is not limited thereto. Also, the present disclosure may have additional effects and other suitable properties relating to the present technology may be realized and as further described.

Figure 1:
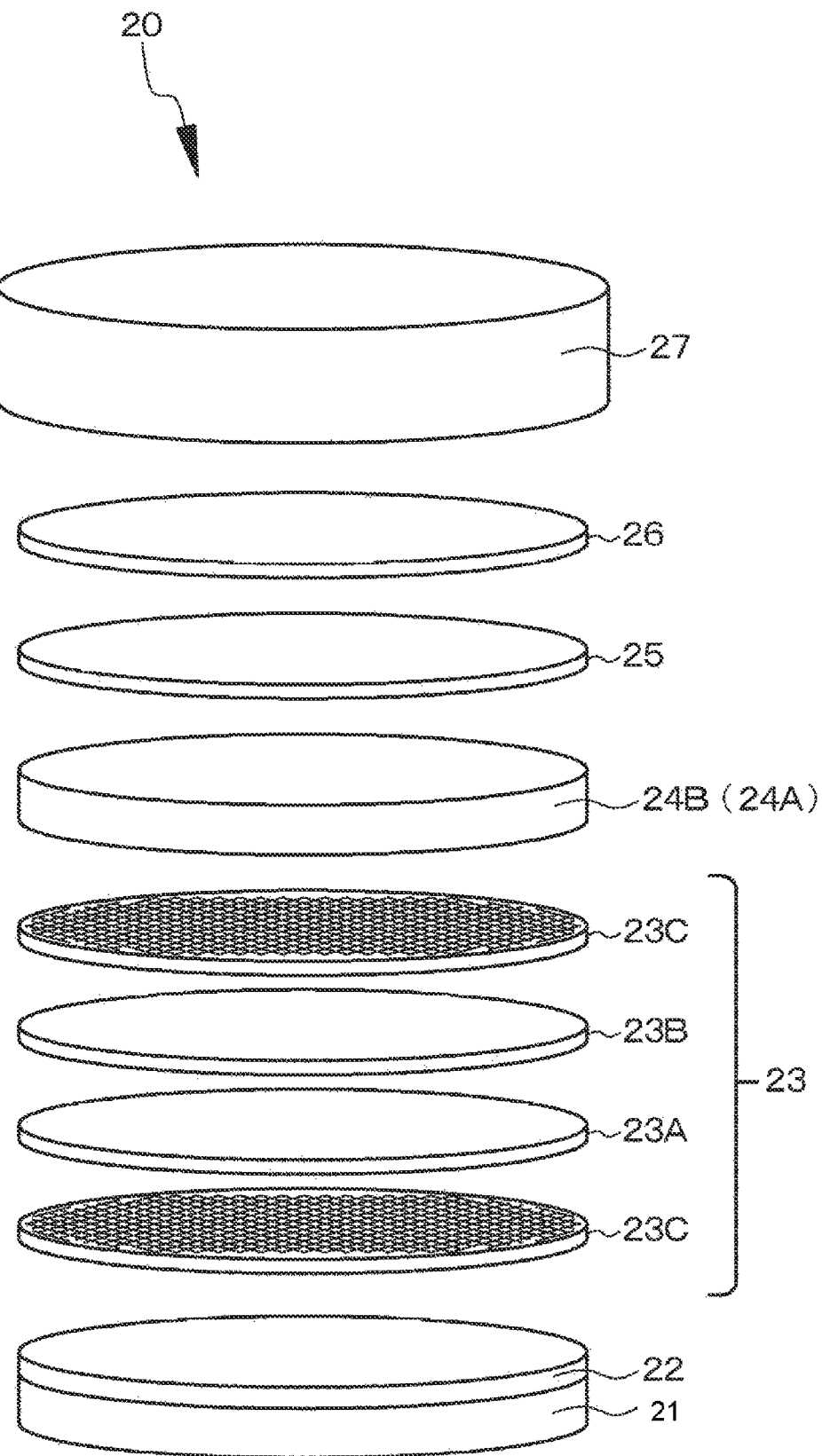
FIG. 1 is a schematic exploded view of a magnesium-sulfur secondary battery of Example 1 according to an embodiment of the present disclosure.

of the present disclosure in Example 3, a block diagram illustrating a configuration of an application example (a power storage system) of the present disclosure in Example 3, and a block diagram illustrating a configuration of an application example (a power tool) of the present disclosure in Example 3, respectively.

DETAILED DESCRIPTION

As described herein, the present disclosure will be described based on examples with reference to the drawings, but the present disclosure is not to be considered limited to the examples, and various numerical values and materials in the examples are considered by way of example.

In the magnesium-sulfur secondary battery of the present disclosure, it is possible to have a form in which the carbon material layer and the electrolyte layer face each other. In other words, it is possible to have a form in which the positive electrode active material layer, the carbon material layer, and the electrolyte layer are disposed in this order, and the positive electrode active material layer and the carbon material layer are in close contact with each other.

In the magnesium-sulfur secondary battery positive electrode of the present disclosure or the magnesium-sulfur secondary battery of the present disclosure including the above-described preferred forms, it is possible to have a form in which the laminated structure is sandwiched between meshes containing a metal or an alloy. Here, examples of the material constituting the meshes include nickel, a nickel alloy, stainless steel, and platinum.

Further, in the magnesium-sulfur secondary battery positive electrode of the present disclosure or the magnesium-sulfur secondary battery of the present disclosure, which includes the preferred forms, or in the method for producing a magnesium-sulfur secondary battery positive electrode of the present disclosure, it is possible to have a form in which the carbon material layer contains a graphite-based carbon material having conductivity.

Further, in the magnesium-sulfur secondary battery positive electrode of the present disclosure or the magnesium-sulfur secondary battery of the present disclosure, which includes the above-described various preferred forms, it is possible to have a form in which the positive electrode active material layer and the carbon material layer are pressure-bonded.

In the magnesium-sulfur secondary battery positive electrode of the present disclosure or the positive electrode constituting the magnesium-sulfur secondary battery of the present disclosure, which includes the above-described various preferred forms, it is possible to have a structure in which the positive electrode active material layer is formed on a surface of a positive electrode current collector. The positive electrode current collector contains, for example, a metal foil such as a nickel foil. However, the positive electrode can have a structure including only the positive electrode active material layer without including the positive electrode current collector. The positive electrode active material layer may contain at least one of a conductive auxiliary agent and a binder as necessary. The positive electrode active material layer contains, for example, sulfur (S) such as $S_8$, polymeric sulfur or metal polysulfide.

The negative electrode active material constituting the negative electrode contains a magnesium-based material. Specifically, the negative electrode active material contains magnesium (a magnesium metal simple substance), a magnesium alloy or a magnesium compound. A negative electrode active material layer may contain at least one of a conductive auxiliary agent and a binder as necessary. The negative electrode is produced from, for example, a plate-like material or a foil-like material. However, the negative electrode is not limited thereto, and can be formed (shaped) using powder. In some cases, an electrolytic solution containing a sulfone and a magnesium salt (electrolytic solution in the present disclosure) is used to produce the negative electrode based on an electrolytic plating method, an electroless plating method, or a combination of the electroless plating method and the electrolytic plating method. The negative electrode may include a negative electrode current collector. Examples of the material constituting the negative electrode current collector include a metal foil such as a copper foil, a nickel foil, and/or a stainless steel foil.

Examples of the conductive auxiliary agent contained in the positive electrode active material layer or the negative electrode active material layer include carbon materials such as graphite, carbon fiber, carbon black, and a carbon nanotube. These carbon materials may be used singly, or in a mixture of two or more kinds thereof. As the carbon fiber, for example, vapor growth carbon fiber (VGCF) can be used. As carbon black, for example, acetylene black or ketjen black can be used. As the carbon nanotube, for example, a single-wall carbon nanotube (SWCNT) or a multi-wall carbon nanotube (MWCNT) such as a double-wall carbon nanotube (DWCNT) can be used. A material other than the carbon material can be used as long as the material has good conductivity. For example, a metal material such as Ni powder and/or a conductive polymer material can be used. As a binder contained in the positive electrode active material layer or the negative electrode active material layer, for example, a polymer resin such as a fluorine-based resin such as polyvinylidene fluoride (PVdF) or polytetrafluoroethylene (PTFE), a polyvinyl alcohol (PVA)-based resin, and/or a styrene-butadiene copolymer rubber (SBR)-based resin can be used. Further, a conductive polymer may be used as the binder. As the conductive polymer, for example, substituted or unsubstituted polyaniline polypyrrole, polythiophene, and a (co)polymer containing one or two compounds selected from substituted or unsubstituted polyaniline, polypyrrole, and polythiophene can be used.

The positive electrode and the negative electrode are separated by an inorganic separator or an organic separator for allowing magnesium ions to pass while preventing a short circuit due to the contact between both the electrodes. Examples of the inorganic separator include a glass filter and/or a glass fiber. Examples of the organic separator include a porous film containing a synthetic resin such as polytetrafluoroethylene, polypropylene, and/or polyethylene, and the organic separator may have a structure in which two or more of the porous films are layered. Above all, a polyolefin porous film is preferable because of having an excellent short circuit prevention effect and intending to improve the safety of the battery due to the shutdown effect.

The electrolytic solution constituting the electrolyte layer in the magnesium-sulfur secondary battery of the present disclosure may be, for example, in the form of containing a sulfone and a magnesium salt dissolved in the sulfone. The form is conveniently referred to as "an electrolytic solution according to the first form of the present disclosure". The magnesium salt may be in the form of $MgX_n$ (where n is 1 or 2, and X is a monovalent or divalent anion). In this case, X may be in the form of a halogen-containing molecule, $-SO_4$, $-NO_3$ or a hexaalkyl disiazide group. Specifically, the halogen-containing molecule (halide) may be in the form of $MgX_2$ (X=F, Cl, Br, I), and more specific examples thereof include magnesium fluoride ($MgF_2$), magnesium chloride ($MgCl_2$), magnesium bromide ($MgBr_2$), and magnesium iodide ($MgI_2$). Alternatively, the magnesium salt may be in the form of at least one magnesium salt selected from the group consisting of a mixed system of $MgCl_2$ and $Mg(TFSI)_2$[magnesium bistrifluoromethanesulfonylimide], magnesium perchlorate ($Mg(ClO_4)_2$), magnesium nitrate ($Mg(NO_3)_2$), magnesium sulfate ($MgSO_4$), magnesium acetate ($Mg(CH_3COO)_2$), magnesium trifluoroacetate ($Mg(CF_3COO)_2$), magnesium tetrafluoroborate ($Mg(BF_4)_2$), magnesium tetraphenylborate ($Mg(B(C_6H_5)_4)_2$), magnesium hexafluorophosphate ($Mg(PF_6)_2$), magnesium hexafluoroarsenate ($Mg(AsF_6)_2$), and magnesium perfluoroalkylsulfonate (($Mg(R_{f1}SO_3)_2$), where $R_{f1}$ is a perfluoroalkyl group), magnesium perfluoroalkylsulfonylimide ($Mg((R_{f2}SO_2)_2N)_2$, where $R_{f2}$ is a perfluoroalkyl group) and magnesium hexaalkyl disiazide (($Mg(HRDS)_2$), where R is an alkyl group). The magnesium salts listed from magnesium fluoride to ($Mg(HRDS)_2$) are conveniently referred to as "magnesium salt-A". In magnesium salt-A, the molar ratio of the sulfone to the magnesium salt is, for example, preferably 4 or more and 35 or less, more preferably 6 or more and 16 or less, and still more preferably 7 or more and 9 or less, but is not limited thereto.

Alternatively, examples of the magnesium salt in the electrolytic solution according to the first form of the present disclosure include magnesium borohydride ($Mg(BH_4)_2$). As described above, when a magnesium salt to be used contains magnesium borohydride ($Mg(BH_4)_2$) and contains no halogen atom, it is unnecessary to produce various members constituting the magnesium-sulfur secondary battery from a material having high corrosion resistance. The electrolytic solution can be produced by dissolving magnesium borohydride in a sulfone. The magnesium salt composed of magnesium borohydride ($Mg(BH_4)_2$) is conveniently referred to as "magnesium salt-B". The electrolytic solution in the present disclosure is a magnesium ion-containing nonaqueous electrolytic solution in which magnesium salt-B is dissolved in a solvent including a sulfone. The molar ratio of the sulfone to magnesium salt-B in the electrolytic solution is, for example, 50 or more and 150 or less, typically 60 or more and 120 or less, preferably 65 or more and 75 or less, but is not limited thereto.

In these configurations, the sulfone may be an alkyl sulfone or an alkylsulfone derivative each represented by $R_1R_2SO_2$ (where $R_1$ and $R_2$ represent an alkyl group). The types of $R_1$ and $R_2$ (i.e., the number of carbon atoms, and the combination thereof) are not particularly limited, and selected as necessary. The number of carbon atoms in each of $R_1$ and $R_2$ is preferably 4 or less, but is not limited thereto. The sum of the number of carbon atoms in $R_1$ and the number of carbon atoms in $R_2$ is preferably 4 or more and 7 or less, but is not limited thereto. Examples of $R_1$ and $R_2$ include a methyl group, an ethyl group, an n-propyl group, an i-propyl group, an n-butyl group, an i-butyl group, a s-butyl group, and a t-butyl group.

Specific examples of the alkyl sulfone include at least one alkylsulfone selected from the group consisting of dimethyl sulfone (DMS), methyl ethyl sulfone (MES), methyl-n-propylsulfone (MnPS), methyl-i-propyl sulfone (MiPS), methyl-n-butylsulfone (MnBS), methyl-i-butylsulfone (MiBS), methyl-s-butylsulfone (MsBS), methyl-t-butylsulfone (MtBS), ethyl methyl sulfone (EMS), diethyl sulfone (DES), ethyl-n-propylsulfone (EnPS), ethyl-i-propylsulfone (EiPS), ethyl-n-butyl sulfone (EnES), ethyl-i-butylsulfone (EiBS), ethyl-s-butylsulfone (EsBS), ethyl-t-butylsulfone (EtBS), di-n-propylsulfone (DnPS), di-i-propylsulfone (DiPS), n-propyl-n-butylsulfone (nPnBS), n-butylethylsulfone (nBES), butylethylsulfone (iBES), s-butylethylsulfone (sBES), and di-n-butylsulfone (DnBS). Examples of the alkylsulfone derivative include ethyl phenyl sulfone (EPhS). Among these sulfones, at least one selected from the group consisting of EnPS, EiPS, EsBS, and DnPS is preferable.

Alternatively, the electrolytic solution may be in the form of containing ether (an aprotic solvent; in a broader sense) and a magnesium salt dissolved in the ether (the aprotic solvent). The form is conveniently referred to as "an electrolytic solution according to the second form of the present disclosure". In this case, the magnesium salt may be in the form of $Mg(AlCl_3R^1)_2$ or $Mg(AlCl_2R^2R^3)_2$ (where $R^1$, $R^2$, and $R^3$ represent an alkyl group). The types of $R^1$, $R^2$, and $R^3$ (i.e., the number of carbon atoms, and the combination thereof) are not particularly limited, and selected as necessary. The number of carbon atoms in each of $R^1$, $R^2$, and $R^3$ is preferably 4 or less, but is not limited thereto. The sum of the number of carbon atoms in $R^1$ and the number of carbon atoms in $R^3$ is preferably 4 or more and 7 or less, but is not limited thereto. Examples of $R^1$, $R^2$, and $R^3$ include a methyl group, an ethyl group, an n-propyl group, an i-propyl group, an n-butyl group, an i-butyl group, a s-butyl group, and a t-butyl group.

The ether may be in the form of a cyclic ether or a linear ether, and specific examples of the cyclic ether include at least one cyclic ether selected from the group consisting of tetrahydrofuran (THF), dioxolane, dioxane, epoxides, and furans. Examples of the linear ether include dialkyl glycol ether, and further examples of dialkyl glycol ether include at least one dialkyl glycol ether selected from the group consisting of ethylene glycol dimethyl ether, diethylene glycol dimethyl ether, triethylene glycol dimethyl ether, tetraethylene glycol dimethyl ether, pentaethylene glycol dimethyl ether, hexaethylene glycol dimethyl ether, and polyethylene glycol dimethyl ether, and triethylene glycol butyl methyl ether. The cyclic ether and the linear ether are not particularly limited to the above examples.

Alternatively, the electrolytic solution in the present disclosure contains a solvent including a sulfone and a nonpolar solvent, and magnesium salt-A dissolved in the solvent.

The nonpolar solvent is selected as necessary, and is preferably a nonaqueous solvent in which both the relative permittivity and the number of donors are 20 or less. More specifically, the nonpolar solvent is, for example, at least one nonpolar solvent selected from the group consisting of an aromatic hydrocarbon, an ether, a ketone, an ester, and a chain carbonate ester. Examples of the aromatic hydrocarbon include toluene, benzene, o-xylene, m-xylene, p-xylene and/or 1-methylnaphthalene. Examples of the ether include diethyl ether and/or tetrahydrofuran. Examples of the ketone include 4-methyl-2-pentanone. Examples of the ester include methyl acetate and/or ethyl acetate. Examples of the chain carbonate ester include dimethyl carbonate, diethyl carbonate and/or ethyl methyl carbonate.

The sulfone and magnesium salt-A is as mentioned above. Further, the above-mentioned additive may be added to the electrolytic solution as necessary. The molar ratio of the sulfone to magnesium salt-A is, for example, preferably 4 or more and 20 or less, more preferably 6 or more and 16 or less, and still more preferably 7 or more and 9 or less, but is not limited thereto.

Other examples of the solvent include ethylene carbonate, propylene carbonate, dimethyl carbonate, diethyl carbonate, ethyl methyl carbonate, methyl propyl carbonate, acetonitrile, dimethoxyethane, diethoxyethane, vinylene carbonate, γ-butyrolactone, tetrahydrofuran. These solvents may be used singly, or in a mixture of two or more kinds thereof.

Alternatively, the solvent preferably includes a linear ether. Specific examples of the linear ether include ethylene glycol dimethyl ether (dimethoxyethane), diethylene glycol dimethyl ether, triethylene glycol dimethyl ether, tetraethylene glycol dimethyl ether, pentaethylene glycol dimethyl ether, hexaethylene glycol dimethyl ether, polyethylene glycol dimethyl ether, and/or triethylene glycol butyl methyl ether. Among the linear ethers, ethylene glycol dimethyl ether (dimethoxyethane (DME)) is preferably used.

The electrolyte layer may include the electrolytic solution in the present disclosure and a polymer compound serving as a holding body that holds the electrolytic solution. The polymer compound may be swollen by the electrolytic solution. In this case, the polymer compound swollen by the electrolytic solution may be in the form of gel. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, and/or polycarbonate. In particular, polyacrylonitrile, polyvinylidene fluoride, polyhexafluoropropylene or polyethylene oxide is preferred from the viewpoint of electrochemical stability. The electrolyte layer may serve as a solid electrolyte layer.

Figure 3:
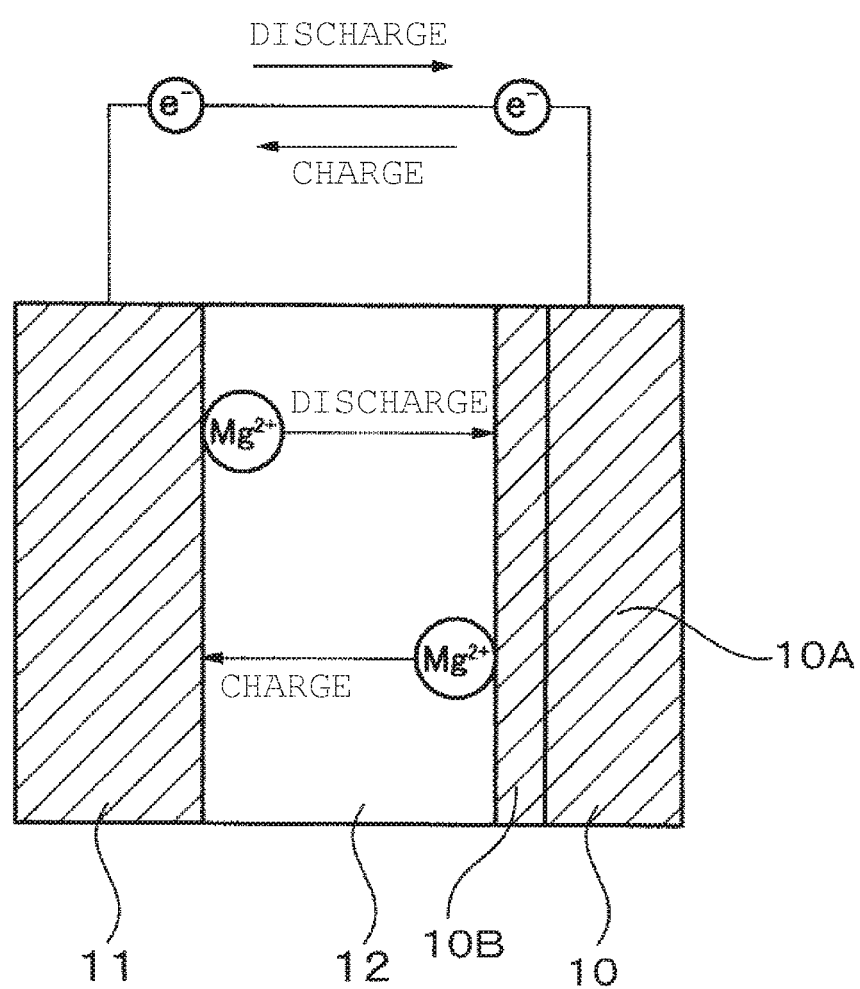
FIG. 3 is a conceptual diagram of a magnesium-sulfur secondary battery according to an embodiment of the present disclosure.

In the magnesium-sulfur secondary battery having the above-described configuration, as illustrated in the conceptual diagram in FIG. 3, magnesium ions ($Mg^{2+}$) move from a positive electrode active material layer 10A of the positive electrode 10 which is formed by laminating (pressure-bonding) the positive electrode active material layer 10A and a carbon material layer 10B to a negative electrode 11 through an electrolyte layer 12 via the carbon material layer 10B during charging, whereby electric energy is converted into chemical energy for power storage. The magnesium ions return from the negative electrode 11 to the positive electrode 10 through the electrolyte layer 12 during discharging, whereby electric energy is generated.

The magnesium-sulfur secondary battery of the present disclosure can be used as a driving power supply or an auxiliary power supply for, for example, a notebook-type personal computer, a personal digital assistant (PDA), a mobile phone, a smart phone, a cordless base unit or a cordless handset, a video movie, a digital still camera, an electronic book, an electronic dictionary, a portable music player, a radio, a headphone, a game machine, a navigation system, a memory card, a cardiac pacemaker, a hearing aid, a power tool, an electric shaver, a refrigerator, an air conditioner, a television receiver, a stereo, a water heater, a microwave oven, a dishwasher, a washing machine, a drying machine, a lighting device, a toy, a medical device, an IoT device or an IoT terminal, a robot, a road conditioner, a traffic light, a railway vehicle, a golf cart, an electric cart, an electric car (including a hybrid car), and the like. Further, the battery can be mounted on a building such as a house or a power storage power supply for power generation facilities, or can be used in order to supply electric power thereto. In an electric car, a conversion device that converts electric power into a driving force by supplying power is generally a motor. A control device (controller) that performs information processing relating to vehicle control includes a control device that displays the remaining amount based on information relating to the remaining amount of the battery.

Further, the battery can also be used in a power storage device in a so-called smart grid. The power storage device can supply electric power and can also store electric power by receiving electric power from another power source. Examples of the other power source to be used include thermal power generation, nuclear power generation, hydro-power generation, a solar cell, wind power generation, geothermal power generation, and a fuel cell (including a biofuel cell).

The magnesium-sulfur secondary battery of the present disclosure including the above-described various preferred forms can be applied to a secondary battery, a control unit (controller) that performs control relating to the secondary battery, and a secondary battery in a battery pack having an exterior that encloses the secondary battery. In the battery pack, the control unit controls, for example, charging and discharging, over-discharging or over-charging associated with the secondary battery.

The magnesium-sulfur secondary battery of the present disclosure including the above-described various preferred forms can be applied to a secondary battery in an electronic device that receives electric power supplied from the secondary battery.

The magnesium-sulfur secondary battery of the present disclosure including the above-described various preferred forms can be applied to a secondary battery in an electric vehicle including a conversion device that receives electric power supplied from the secondary battery and converts the electric power into a driving force of the vehicle, and a control device (controller) that performs information processing relating to vehicle control based on information relating to the secondary battery. In the electric vehicle, the conversion device typically receives electric power supplied from the secondary battery, drives a motor, and generates a driving force. Driving of the motor can also use regenerative energy. Further, for example, the control device (controller) performs information processing relating to vehicle control based on the remaining amount of a secondary battery. Examples of this electric vehicle include a so-called hybrid car in addition to an electric car, an electric motorcycle, an electric bicycle, and a railway vehicle.

The magnesium-sulfur secondary battery of the present disclosure including the above-described various preferred forms can be applied to a secondary battery in an electric power system configured to receive electric power from the secondary battery and/or to supply electric power from a power source to the secondary battery. This electric power system may be any electric power system as long as it almost uses electric power and includes merely an electric power device. This electric power system includes, for example, a smart grid, a household energy management system (HEMS) or a vehicle, and can also store electricity.

The magnesium-sulfur secondary battery of the present disclosure including the above-described various preferred forms can be applied to a secondary battery in a power storage power supply including a secondary battery and configured to be connected to an electronic device to which electric power is supplied. This power storage power supply can be basically used for any electric power system or electric power device regardless of application of the power storage power supply, but can be used for a smart grid, for example.

Example 1 relates to a magnesium-sulfur secondary battery positive electrode of the present disclosure, a method for producing the magnesium-sulfur secondary battery positive electrode, and a magnesium-sulfur secondary battery.

That is, a magnesium-sulfur secondary battery positive electrode 23 of Example 1 includes a laminated structure formed by laminating a positive electrode active material layer 23A containing sulfur or a sulfur compound and a carbon material layer 23B. Further, the magnesium-sulfur secondary battery 20 of Example 1 includes:

a positive electrode 23 including a laminated structure formed by laminating a positive electrode active material layer 23A containing sulfur or a sulfur compound and a carbon material layer 23B;

an electrolyte layer 24A; and a negative electrode 25.

The carbon material layer 23B and the electrolyte layer 24A face each other. In other words, the positive electrode active material layer 23A, the carbon material layer 23B, and the electrolyte layer 24A (a separator 24B) are disposed in this order, and the positive electrode active material layer 10A and the carbon material layer 10B are in close contact with each other. Further, the laminated structure is sandwiched between meshes 23C and 23C containing a metal or an alloy (specifically, nickel). Furthermore, specifically, the positive electrode active material layer 23A contains sulfur (S) in Example 1. Graphite (manufactured by TIMCAL: trade name KS-15) was used as a material constituting the carbon material layer 23B. The positive electrode active material layer 23A and the carbon material layer 23B are pressure-bonded.

The magnesium-sulfur secondary battery of Example 1 contained the materials shown in Table 1 below.

TABLE 1

| Components of the positive electrode active material layer |
|---|
| Sulfur (S) (manufactured by FUJIFILM Wako Pure Chemical Corporation) |
| Conductive auxiliary agent [ketjen black (KB) ECP600JD, manufactured by Lion Corporation.] |
| Binder [polytetrafluoroethylene (PTFE), manufactured by AGC Inc.] |
| Components of the carbon material layer |
| Graphite (KS-15) |
| Binder [polytetrafluoroethylene (PTFE), manufactured by AGC Inc.] |
| Components of the negative electrode |
| Magnesium plate, manufactured by Rikazai Co., Ltd. (purity: 99.9%, thickness: 0.2 mm) |
| Components of the separator |
| Glass fiber GC50, manufactured by Advantec Toyo Kaisha, Ltd. |
| Components of the electrolyte layer |
| $MgCl_2$ anhydride, manufactured by Sigma-Aldrich Japan |
| Ethyl-n-propylsulfone (EnPS), manufactured by Tomiyama Pure Chemical Industries, ltd. |
| (Dehydration mode for battery) |
| $MgCl_2$ anhydride (mol)/EnPS (mol) = 1/8 |

Then, a magnesium-sulfur secondary battery (a coin battery type CR2016) was produced, in which the positive electrode contained sulfur (S) (i.e., including the positive electrode in which sulfur was used as the positive electrode active material) and the negative electrode contained magnesium. Specifically, the coin battery having a carbon material layer (see FIG. 1) was produced using magnesium (Mg) as the negative electrode and using sulfur (S) as the positive electrode. Then, the cycle characteristics were examined. The test conditions are shown in Table 2 below.

TABLE 2

| Discharge condition: 0.06 mA (constant current discharge)/cutoff voltage 0.2 V |
|---|
| Charge condition: 0.06 mA (constant current charge)/2.7 V-1500 m Ah/gram cutoff |
| Temperature: 25° C. |

In production of the positive electrode active material layer 23A, 10% by mass of sulfur ($S_8$), 60% by mass of ketjen black as a conductive auxiliary agent, and 30% by mass of polytetrafluoroethylene (PTFE) as a binder were mixed using an agate mortar. Then, while the resulting mixture was plunged in acetone, the mixture was rolled and molded about 10 times with a roller compactor. Thereafter, the resultant product was vacuum-dried at 70° C. for 12 hours. Thus, the positive electrode active material layer 23A was obtained.

In production of the carbon material layer 23B, 75% by mass of KS-15 was mixed with 25% by mass of polytetrafluoroethylene (PTFE) as a binder using an agate mortar. Then, while the resulting mixture was plunged in acetone, the mixture was rolled and molded about 10 times with a roller compactor. Thereafter, the resultant product was vacuum-dried at 70° C. for 12 hours. Thus, the carbon material layer 23B was obtained.

Then, the laminated structure of the positive electrode active material layer 23A and the carbon material layer 23B is sandwiched between the mesh 23C and the mesh 23C (both containing nickel). Thereafter, a pressure of 60 MPa is applied to a whole of the meshes and the laminated structure between the meshes (i.e., the mesh 23C/the positive electrode active material layer 23A/the carbon material layer 23B/the mesh 23C), thereby pressure-bonding the positive electrode active material layer 23A and the carbon material layer 23B. In this way, the positive electrode 23 including the mesh 23C/the positive electrode active material layer 23A/the carbon material layer 23B/the mesh 23C can be obtained.

FIG. 1 illustrates a schematic view illustrating a disassembled state of the coin battery 20. A gasket 22 was placed on a coin battery can 21, on which a positive electrode 23, a glass fiber separator 24B, a negative electrode 25 including a 0.2-mm-thick Mg plate having a diameter of 1.5 mm, a spacer 26 including a 0.5-mm-thick stainless-steel plate, and a coin battery lid 27 were stacked in this order, and then sealed inside by crimping the coin battery can 21. The spacer 26 was spot-welded to the coin battery lid 27 in advance. In the coin battery 20 to be tested, the separator 24B contains an electrolytic solution having the composition shown in Table 1, and constitutes the electrolyte layer 24A.

A magnesium-sulfur secondary battery without including the carbon material layer 23B was produced as the magnesium-sulfur secondary battery of Comparative Example 1.

Figure 2:
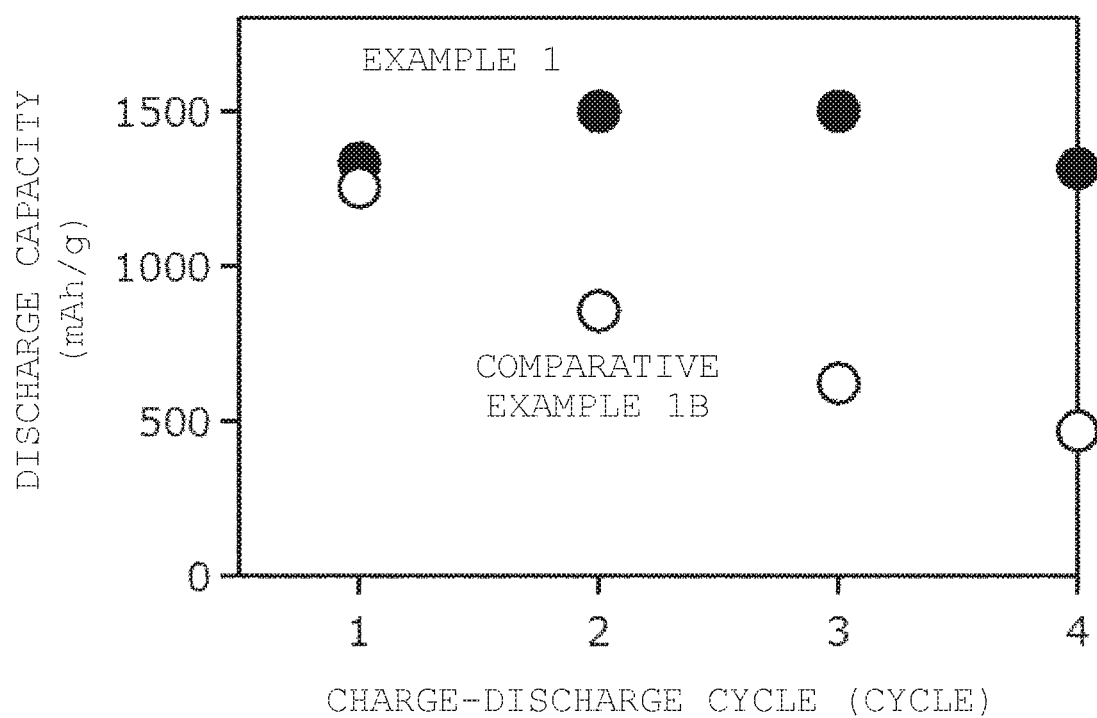
FIG. 2 is a graph illustrating changes in discharge capacities of the magnesium-sulfur secondary battery of Example 1 and a magnesium-sulfur secondary battery of Comparative Example 1 according to an embodiment of the present disclosure.

FIG. 2 illustrates changes in discharge capacities of the magnesium-sulfur secondary battery of Example 1 and the magnesium-sulfur secondary battery of Comparative Example 1. Rapid capacity deterioration was observed in the magnesium-sulfur secondary battery of Comparative Example 1, and the capacity was decreased from 1250 $mAhg^{-1}$ to 470 $mAhg^{-1}$ until the fourth cycle. On the other hand, in the magnesium-sulfur secondary battery of Example 1, almost no capacity deterioration was observed until the fourth cycle, and a capacity of 1300 $mAhg^{-1}$ was maintained. That is, it is found that the positive electrode 23 was produced by press-bonding the carbon material layer 23B containing KS-15 and the positive electrode active material layer 23A containing sulfur, whereby the cycle characteristics were greatly improved. Table 3 shows changes in the discharge capacity retention rates of the magnesium-sulfur secondary battery disclosed in Non-Patent Document 1 (referred to as "Comparative Example 1B") and the magnesium-sulfur secondary battery of Example 1. Table 3 shows that the discharge capacity in each cycle of the magnesium-sulfur secondary battery of Comparative Example 1B is 100%.

TABLE 3

| Discharge capacity retention rate (%) | | | | |
| --- | --- | --- | --- | --- |
| | First cycle | Second cycle | Third cycle | Fourth cycle |
| Example 1 | 188 | 159 | 161 | 138 |
| Comparative Example 1B | 100 | 100 | 100 | 100 | operates stably while exhibiting a high charge-discharge capacity, and has high cycle stability until the fourth cycle as compared to Comparative Example 1B.

In Example 2, the magnesium-sulfur secondary battery of the present disclosure and an application example thereof will be described.

The magnesium-sulfur secondary battery in the present disclosure as described in Example 1 can be applied to a machine, a device, an appliance, an apparatus, and a system (an assembly of a plurality of devices or the like) which can be used as a power source for driving/operating the secondary battery or a power storage source for accumulating power without any particular limitation. The magnesium-sulfur secondary battery (specifically, magnesium-sulfur secondary battery) used as a power supply may be a main power supply (power supply used preferentially) or an auxiliary power supply (power supply used in place of the main power supply, or by switching from the main power supply).

In a case where the magnesium-sulfur secondary battery is used as the auxiliary power supply, the main power supply is not limited to the magnesium-sulfur secondary battery.

Specific examples of applications of the magnesium-sulfur secondary battery (specifically, magnesium-sulfur secondary battery) in the present disclosure include a video camera, a camcorder, a digital still camera, mobile phone, a personal computer, a television receiver, various display devices, a cordless telephone, a headphone stereo, a music player, a portable radio, electronic paper such as an electronic book or an electronic newspaper, various electronic devices such as a portable information terminal including PDA, an electric device (including a portable electronic device); a toy; a portable living appliance such as an electric shaver; a lighting appliance such as a room light; a medical electronic device such as a pacemaker or a hearing aid; a storage device such as a memory card; a battery pack used as a detachable power supply for a personal computer or the like; a power tool such as an electric drill or an electric saw; a power storage system such as a household battery system for accumulating electric power in preparation for emergency or a home energy server (a household power storage device), a power supply system; a power storage unit or a backup power supply; an electric vehicle such as an electric car, an electric motorcycle, an electric bicycle or Segway (registered trademark); and a power driving force conversion device of an airplane or a ship (specifically, for example, a power motor), but are not limited to these applications.

Among these applications, the magnesium-sulfur secondary battery in the present disclosure is effectively applied to a battery pack, an electric vehicle, a power storage system, a power supply system, a power tool, an electronic device, an electric device or the like. A battery pack is a power supply using the magnesium-sulfur secondary battery in the present disclosure, and is a so-called "assembled battery" or the like. An electric vehicle is a vehicle that operates (runs) using the magnesium-sulfur secondary battery in the present disclosure as a driving power supply, and may be an automobile (a hybrid car or the like) that is additionally equipped with a driving source other than a secondary battery. A power storage system (a power supply system) is a system that uses the magnesium-sulfur secondary battery in the present disclosure as a power storage source. For example, in a household power storage system (a power supply system), an electric power is stored in the magnesium-sulfur secondary battery in the present disclosure that serves as a power storage source, and home electric appliances or the like can be used utilizing the electric power. A power tool is a tool in which a movable section (e.g., a drill) can move utilizing the magnesium-sulfur secondary battery in the present disclosure as a driving power supply. An electronic device and an electric device are devices that exhibit various functions utilizing the magnesium-sulfur secondary battery in the present disclosure as an operation power supply (a power supply source).

Figure 4A:
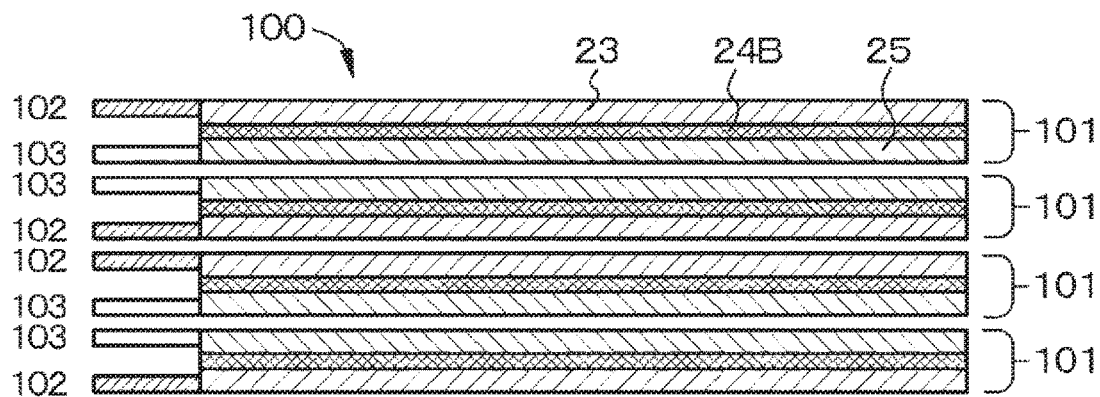
FIGS. 4A, 4B, and 4C are a schematic cross-sectional view of laminated members constituting the magnesium-sulfur secondary battery of the present disclosure in Example 2, a schematic cross-sectional view of the magnesium-sulfur secondary battery of the present disclosure in Example 2, and a schematic plan view of the magnesium-sulfur secondary battery of the present disclosure in Example 2, respectively.
Figure 4B:
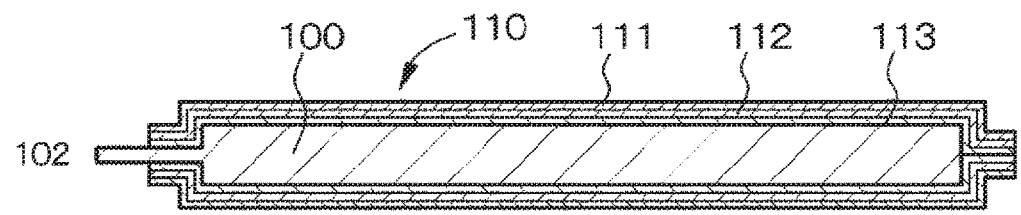
Figure 4C:
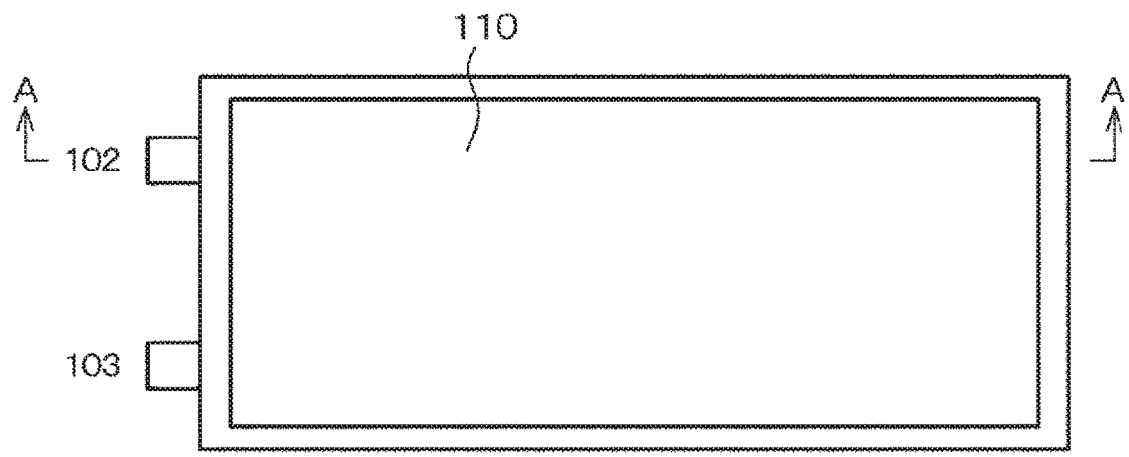

A flat laminated film type magnesium-sulfur secondary battery will be described. FIG. 4A is a schematic cross-sectional view of laminated members constituting the magnesium-sulfur secondary battery of the present disclosure in Example 2, FIG. 4B is a schematic cross-sectional view of the magnesium-sulfur secondary battery of the present disclosure in Example 2, and FIG. 4C is a schematic plan view of the magnesium-sulfur secondary battery of the present disclosure in Example 2. The schematic cross-sectional view of FIG. 4A is a schematic cross-sectional view taken along an arrow A-A of FIG. 4C. In FIG. 4A, the laminated members are illustrated as being separated from each other, but actually, the laminated members are in contact with each other.

A laminated member 101 including the positive electrode 23, the electrolyte layer 24A (the separator 24B), and the negative electrode 25 produced in the same manner as described in Example 1 is prepared. Then, the laminated members 101 are arranged so that the positive electrodes face each other and the negative electrodes face each other, and the laminated members 101 are overlapped. Subsequently, electrode sections for taking out the laminated member (respective projecting sections 102 and respective projecting sections 103) are joined by an ultrasonic welder, and are electrically connected in parallel to form a magnesium-sulfur secondary battery (magnesium-sulfur secondary battery before assembly) 100.

An exterior member obtained by laminating a resin layer 111 containing a polyethylene terephthalate film having a thickness of 50 μm, an intermediate layer 112 containing an aluminum foil having a thickness of 20 μm, and a heat seal material layer 113 containing a biaxially oriented polypropylene (CPP) film having a thickness of 30 μm was used as an exterior member 110. Then, the magnesium-sulfur secondary battery 100 before assembly was covered with the exterior member and sealed with a heat sealer under reduced pressure, i.e., the heat seal material layers 113 are welded to form a magnesium-sulfur secondary battery. The projecting section 102 and the projecting section 103 protrude from the exterior member.

Subsequently, some application examples of the magnesium-sulfur secondary battery in the present disclosure will be specifically described. Note that the configuration of each application example described below is just considered by way of example, and the configuration can be changed appropriately.

The battery pack is a simplified battery pack (a so-called soft pack) that uses one magnesium-sulfur secondary battery according to the present disclosure, and is mounted in, for example, an electronic device typified by a smart phone. Alternatively, the battery pack includes an assembled battery including six of the magnesium-sulfur secondary batteries in the present disclosure connected in 2 parallel and 3 series. The magnesium-sulfur secondary battery may be connected in series, in parallel, or in series-parallel combination.

Figure 5:
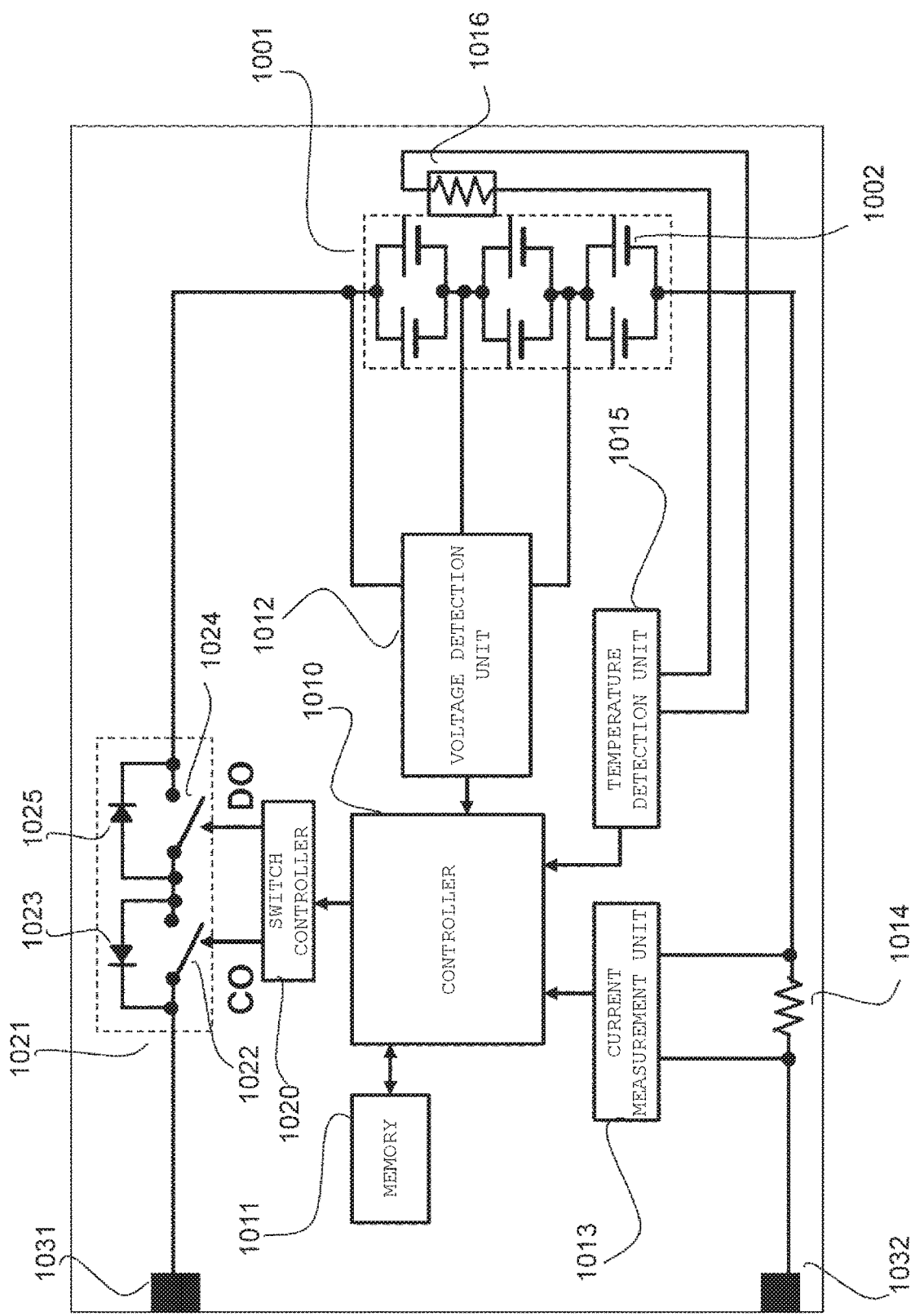
FIG. 5 is a block diagram illustrating a circuit configuration example in Example 3 in a case where the magnesium-sulfur secondary battery in the present disclosure, described in Example 1, is applied to a battery pack.

FIG. 5 illustrates a block diagram illustrating a circuit configuration example in a case where the magnesium-sulfur secondary battery in the present disclosure is applied to a battery pack. The battery pack includes a cell (an assembled battery) 1001, an exterior member, a switch section 1021, a current detection resistor 1014, a temperature detection element 1016, and a controller 1010. The switch section 1021 includes a charge control switch 1022 and a discharge control switch 1024. Further, the battery pack includes a positive electrode terminal 1031 and a negative electrode terminal 1032. When the battery pack is charged, the positive electrode terminal 1031 and the negative electrode terminal 1032 are respectively connected to a positive electrode terminal and a negative electrode terminal of a charger, and charging is performed. When an electronic device is used, the positive electrode terminal 1031 and the negative electrode terminal 1032 are respectively connected to a positive electrode terminal and a negative electrode terminal of the electronic device, and discharging is performed.

The cell 1001 is constituted by connecting a plurality of magnesium-sulfur secondary batteries 1002 in the present disclosure in series and/or in parallel. FIG. 5 illustrates a case where six of the magnesium-sulfur secondary batteries 1002 are connected in 2 parallel and 3 series (2P3S). In addition, any other connection method such as p parallel and q series (where p and q are integers) may be used.

The switch section 1021 includes a charge control switch 1022 and a diode 1023, and a discharge control switch 1024 and a diode 1025, and is controlled by the controller 1010. The diode 1023 has a backward polarity with respect to a charge current flowing in a direction from the positive electrode terminal 1031 to the cell 1001 and a forward polarity with respect to a discharge current flowing from the negative electrode terminal 1032 to the cell 1001. The diode 1025 has a forward polarity with respect to the charge current and a backward polarity with respect to the discharge current. The switch section is provided on the plus (+) side, but may be provided on the minus (−) side. The controller 1010 controls the charge control switch 1022 such that the charge control switch 1022 is closed in a case where the battery voltage reaches an overcharge detection voltage, and no charge current flows in a current path of the cell 1001. After the charge control switch 1022 is closed, only discharge can be performed through the diode 1023. Furthermore, the controller 1010 controls the charge control switch 1022 such that the charge control switch 1022 is closed in a case where a large amount of current flows during charging, and a charge current flowing in a current path of the cell 1001 is cut off. The controller 1010 controls the discharge control switch 1024 such that the discharge control switch 1024 is closed in a case where the battery voltage reaches an overdischarge detection voltage, and no discharge current flows in a current path of the cell 1001. After the discharge control switch 1024 is closed, only charge can be performed through the diode 1025. Furthermore, the controller 1010 controls the discharge control switch 1024 such that the discharge control switch 1024 is closed in a case where a large amount of current flows during discharging, and a discharge current flowing in a current path of the cell 1001 is cut off.

For example, the temperature detection element 1016 includes a thermistor, and is disposed in the vicinity of the cell 1001. A temperature measurement unit 1015 measures the temperature of the cell 1001 using the temperature detection element 1016, and sends the measurement result to the controller 1010. A voltage measurement unit 1012 measures the voltage of the cell 1001 and the voltage of each of the magnesium-sulfur secondary batteries 1002 constituting the cell 1001, performs A/D conversion of the measurement result, and sends the converted result to the controller 1010. A current measurement unit 1013 measures a current using the current detection resistor 1014, and sends the measurement result to the controller 1010.

A switch controller 1020 controls the charge control switch 1022 and the discharge control switch 1024 of the switch section 1021 based on a voltage and a current sent from the voltage measurement unit 1012 and the current measurement unit 1013. When a voltage of any one of the magnesium-sulfur secondary batteries 1002 becomes equal to or lower than the overcharge detection voltage or overdischarge detection voltage, or when a large amount of current rapidly flows, the switch controller 1020 sends a control signal to the switch section 1021, and thereby prevents overcharge, overdischarge, and overcurrent charge/discharge. The charge control switch 1022 and the discharge control switch 1024 can be constituted by a semiconductor switch such as a MOSFET. In this case, the diodes 1023 and 1025 are constituted by parasitic diodes of a MOSFET. In a case where a p-channel type FET is used as a MOSFET, the switch controller 1020 supplies a control signal DO and a control signal CO to a gate of each of the charge control switch 1022 and the discharge control switch 1024. The charge control switch 1022 and the discharge control switch 1024 become conductive due to a gate potential lower than a source potential by a predetermined value or more.

That is, in normal charging and discharging operation, each of the control signal CO and the control signal DO is set to a low level, and the charge control switch 1022 and the discharge control switch 1024 are caused to be conductive. In addition, for example, during overcharging or overdischarging, each of the control signal CO and the control signal DO is set to a high level, and the charge control switch 1022 and the discharge control switch 1024 are closed.

For example, a memory 1011 includes an erasable programmable read only memory (EPROM) which is a non-volatile memory. In the memory 1011, a numerical value calculated by the controller 1010, an internal resistance value of each of the magnesium-sulfur secondary batteries 1002 in an initial state, measured at a stage of a production step, and the like are previously stored, and can be rewritten appropriately. Further, the memory 1011 stores a full charge capacity of each of the magnesium-sulfur secondary batteries 1002, whereby the memory 1011 can calculate a remaining capacity together with the controller 1010, for example.

The temperature measurement unit 1015 measures a temperature using the temperature detection element 1016, performs charge-discharge control at the time of abnormal heat generation, and performs correction in calculating the remaining capacity.

Figure 6A:
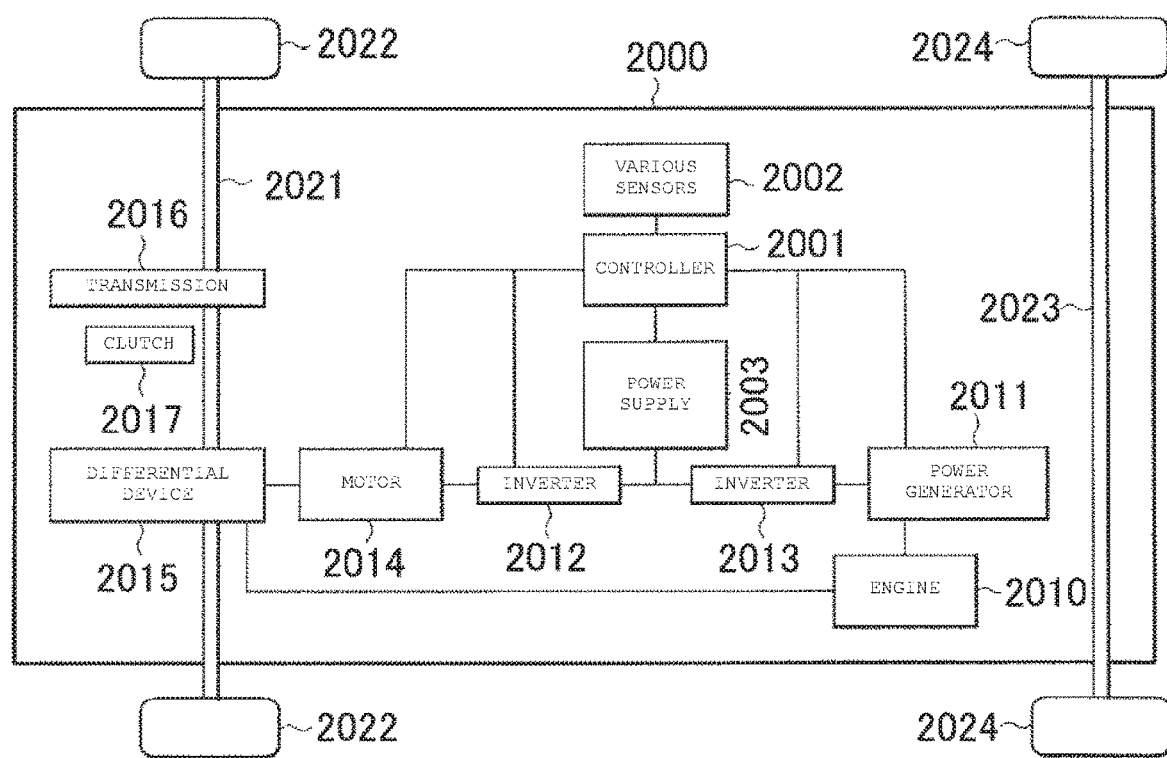
FIGS. 6A, 6B, and 6C are a block diagram illustrating a configuration of an application example (an electric vehicle)

Next, FIG. 6A illustrates a block diagram illustrating a configuration of an electric vehicle such as a hybrid car which is an example of an electric vehicle. The electric vehicle includes, for example, a controller 2001, various sensors 2002, a power supply 2003, an engine 2010, a power generator 2011, an inverter 2012, an inverter 2013, a driving motor 2014, a differential device 2015, a transmission 2016, and a clutch 2017 inside a housing 2000 containing metal. In addition, the electric vehicle includes, for example, a front wheel drive shaft 2021, front wheels 2022, which are connected to the differential device 2015 and the transmission 2016, a rear wheel drive shaft 2023, and rear wheels 2024.

The electric vehicle can run, for example, using either the engine 2010 or the motor 2014 as a driving source. The engine 2010 is a main power source, for example, a gasoline engine. When the engine 2010 is adopted as a power source, the driving force (torque) of the engine 2010 is transmitted to the front wheels 2022 or the rear wheels 2024 via, for example, the differential device 2015, the transmission 2016, and the clutch 2017 which are driving units. Note that the torque of the engine 2010 is transmitted to the power generator 2011, the power generator 2011 thus generates alternating-current power by the use of the torque, and the alternating-current power is converted to direct-current power via the inverter 2013, and thus stored in the power supply 2003. On the other hand, when the motor 2014 as a converter is adopted as a power source, the power (direct-current power) supplied from the power supply 2003 is converted to alternating-current power via the inverter 2012, and the motor 2014 is thus driven by the use of the alternating-current power. The driving force (torque) converted from the electric power by the motor 2014 is transmitted to the front wheels 2022 or the rear wheels 2024 via, for example, the differential device 2015, the transmission 2016, and the clutch 2017 which are driving units.

The electric vehicle may be configured such that when the electric vehicle is decelerated via a braking mechanism (not shown), the resistance force at the time of deceleration is transmitted as a torque to the motor 2014, and the motor 2014 generates alternating-current power by the use of the torque. This alternating-current power is convened to direct-current power via the inverter 2012, and the direct-current regenerative power is preferably stored in the power supply 2003.

The controller 2001 controls the operation of the entire electric vehicle, and includes, for example, a CPU. The power supply 2003 includes one or two or more magnesium-sulfur secondary batteries (not illustrated) described in Example 1. The power supply 2003 may be connected to an external power supply, and supplied with electric power from the external power supply to store the electric power. The various sensors 2002 are used, for example, for controlling a rotation speed of the engine 2010, and controlling an opening level (a throttle opening level) of a throttle valve (not shown). The various sensors 2002 include, for example, a speed sensor, an acceleration sensor, and an engine speed sensor.

It should be understood that although a case where the electric vehicle is a hybrid car has been explained, the electric vehicle may be a vehicle (electric car) that operates through the use of only the power supply 2003 and the motor 2014 without using the engine 2010.

Figure 6B:
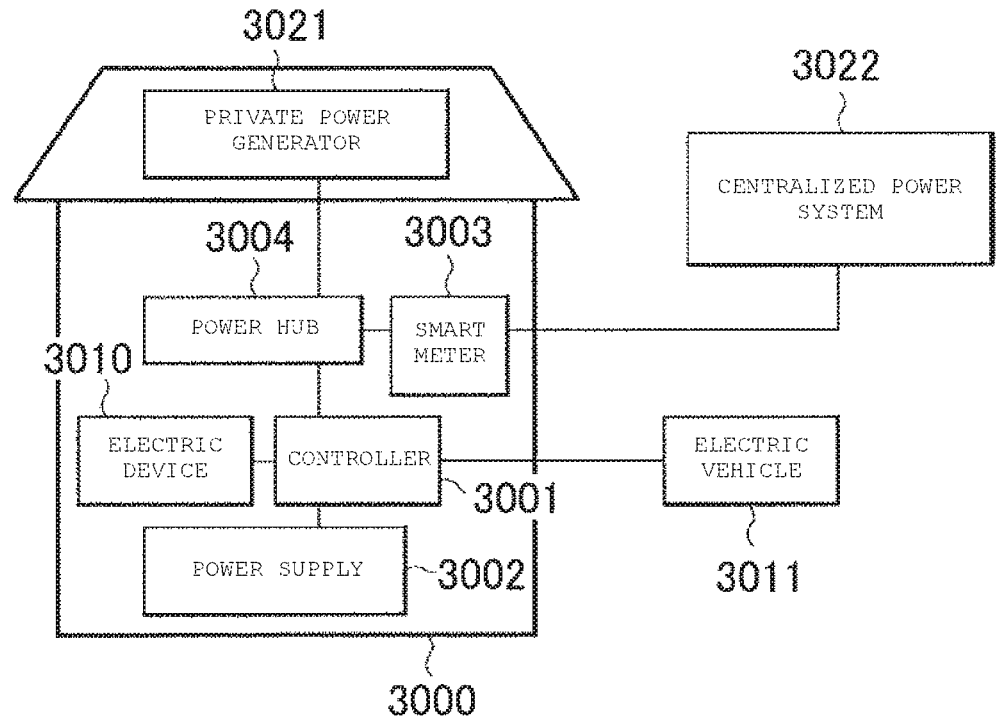

Next, FIG. 6B illustrates a block diagram illustrating a configuration of a power storage system (power supply system). The power storage system includes, for example, a controller 3001, a power supply 3002, a smart meter 3003, and a power hub 3004 inside a house 3000 such as a general residence and a commercial building.

The power supply 3002 is connected to, for example, an electric device (electric device) 3010 installed inside the house 3000, and connectable to an electric vehicle 3011 parked outside the house 3000. Further, the power supply 3002 is, for example, connected via the power hub 3004 to a private power generator 3021 installed in the house 3000, and connectable to an external centralized power system 3022 via the smart meter 3003 and the power hub 3004. The electric device (electronic device) 3010 includes, for example, one or two or more home electric appliances. Examples of the home electric appliances include a refrigerator, an air conditioner, a television receiver, and a water heater. The private power generator 3021 is constituted by, for example, a solar power generator or a wind power generator. Examples of the electric vehicle 3011 include an electric car, a hybrid car, an electric motorcycle, an electric bicycle, and Segway (registered trademark). Examples of the centralized power system 3022 include a commercial power supply, a power generation device, a power transmission network, and a smart grid (next generation power transmission network). Further, examples thereof include a thermal power plant, a nuclear power plant, a hydraulic power plant, and a wind power plant. Examples of the power generation device included in the centralized power system 3022 include various solar cells, a fuel cell, a wind power generation device, a micro hydropower generation device, and a geothermal power generation device. However, the centralized power system 3022 and the power generation device are not limited thereto.

The controller 3001 controls the operation of the entire power storage system (including the usage state of the power supply 3002), and includes, for example, a CPU. The power supply 3002 includes one or two or more magnesium-sulfur secondary batteries (not shown) described in Example 1. The smart meter 3003 is, for example, an electric power meter that is compatible with a network and is installed in the house 3000 demanding electric power, and is communicable with an electric power supplier. The smart meter 3003 controls the balance between demand and supply of electric power in the house 3000 while communicating with the outside, thereby allowing efficient and stable supply of energy.

In this power storage system, for example, electric power is accumulated in the power supply 3002 via the smart meter 3003 and the power hub 3004 from the centralized power system 3022 that is an external power supply, and electric power is accumulated in the power supply 3002 via the power hub 3004 from the private power generator 3021 that is an independent power supply. The electric power stored in the power supply 3002 is supplied to the electric device (electronic device) 3010 and the electric vehicle 3011 in response to an instruction from the controller 3001, thus allowing the operation of the electric device (electronic device) 3010, and allowing the electric vehicle 3011 to be charged. More specifically, the power storage system is a system that allows electric power to be accumulated and supplied in the house 3000 with the use of the power supply 3002.

The electric power stored in the power supply 3002 can be arbitrarily used. For this reason, for example, electric power can be stored in the power supply 3002 from the centralized power system 3022 at midnight when the electricity charge is inexpensive, and the electric power stored in the power supply 3002 can be used during the day when the electricity charge is expensive.

The power storage system described above may be installed for each household (one family unit), or may be installed for a plurality of households (a plurality of family units).

Figure 6C:
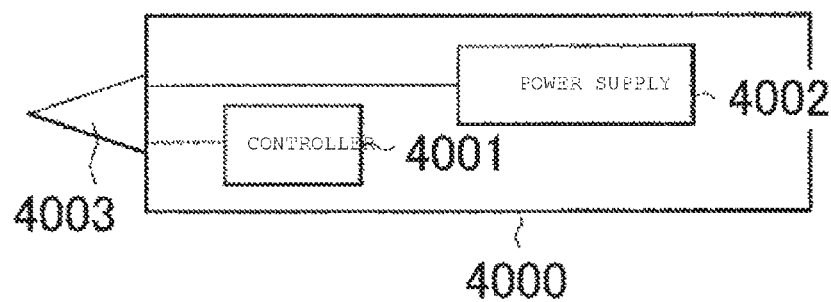

Next, FIG. 6C illustrates a block diagram illustrating a configuration of a power tool. The power tool is, for example, an electric drill, and includes a controller 4001 and a power supply 4002 inside a tool body 4000 formed of a plastic material or the like. For example, a drill section 4003 as a movable section is rotatably attached to the tool body 4000. The controller 4001 controls the operation of the entire power tool (including the usage state of the power supply 4002), and includes, for example, a CPU. The power supply 4002 includes one or two or more magnesium-sulfur secondary batteries (not shown) described in Example 1. The controller 4001 supplies electric power from the power supply 4002 to the drill section 4003 in response to an operation of an operation switch.

The present disclosure has been described above based on the preferred examples, however the present disclosure is not limited to these Examples. The composition of the electrolytic solution, the raw materials used in the production, the production method, the production conditions, the configuration and the structure of the magnesium-sulfur secondary battery and the positive electrode of the magnesium-sulfur secondary battery, described in the Examples, are illustrative, are not limited thereto, and can be changed appropriately. The electrolytic solution in the present disclosure can be mixed with an organic polymer (e.g., polyethylene oxide, polyacrylonitrile, polyvinylidene fluoride (PVdF)) and used as a gel electrolyte.

The present disclosure is described below in further detail according to an embodiment of the present disclosure.

[A01]
<<Magnesium-Sulfur Secondary Battery Positive Electrode>>
A magnesium-sulfur secondary battery positive electrode including a laminated structure formed by laminating a positive electrode active material layer containing sulfur or a sulfur compound and a carbon material layer.

[A02]
The magnesium-sulfur secondary battery positive electrode according to [A01], in which the laminated structure is sandwiched between meshes containing a metal or an alloy.

[A03]
The magnesium-sulfur secondary battery positive electrode according to [A01] or [A02], in which the carbon material layer contains a graphite-based carbon material having conductivity.

[A04]
The magnesium-sulfur secondary battery positive electrode according to any one of [A01] to [A03], in which the positive electrode active material layer and the carbon material layer are pressure-bonded.

[B01]
<<Magnesium-Sulfur Secondary Battery>>
A magnesium-sulfur secondary battery including:
a positive electrode including a laminated structure formed by laminating a positive electrode active material layer containing sulfur or a sulfur compound and a carbon material layer;
an electrolyte layer; and
a negative electrode.

[B02]
The magnesium-sulfur secondary battery according to [B01], in which the carbon material layer and the electrolyte layer face each other.

[B03]
The magnesium-sulfur secondary battery according to [B01] or [B02], in which the laminated structure is sandwiched between meshes containing a metal or an alloy.

[C01]
<<Method for Producing Magnesium-Sulfur Secondary Battery Positive Electrode>>
A method for producing a magnesium-sulfur secondary battery positive electrode including a laminated structure formed by laminating a positive electrode active material layer containing sulfur or a sulfur compound and a carbon material layer, and meshes containing a metal or an alloy between which the laminated structure is sandwiched,
the method including:
sandwiching the laminated structure between the meshes; and
pressure-bonding the positive electrode active material layer and the carbon material layer by applying a pressure to a whole of the meshes and the laminated structure between the meshes.

[D01]
<<Battery Pack>>
A battery pack including:
a secondary battery;
a control unit that performs control relating to the secondary battery; and
an exterior that encloses the secondary battery,
in which the secondary battery includes the magnesium-sulfur secondary battery according to any one of [B01] to [B03].

[D02]
<<Electronic Device>>
An electronic device that receives electric power supplied from a secondary battery,
in which the secondary battery includes the magnesium-sulfur secondary battery according to any one of [B01] to [B03].

[D03]
<<Electric Vehicle>>
An electric vehicle including:
a conversion device that receives electric power supplied from a secondary battery and converts the electric power into a driving force of the vehicle; and
a control device that performs information processing relating to vehicle control based on information relating to the secondary battery,
in which the secondary battery includes the magnesium-sulfur secondary battery according to any one of [B01] to [B03].

[D04]
<<Electric Power System>>
An electric power system configured to receive electric power supplied from a secondary battery and/or to supply electric power from a power source to the secondary battery,
in which the secondary battery includes the magnesium-sulfur secondary battery according to any one of [B01] to [B03].

[D05]
<<Power Storage Power Supply>>
A power storage power supply configured to have a secondary battery and be connected to an electronic device to which power is supplied, in which the secondary battery includes the magnesium-sulfur secondary battery according to any one of [B01] to [B03].

The positive electrode of the present disclosure can be used for a magnesium-sulfur secondary battery.

The magnesium-sulfur secondary battery in the present disclosure can be applied to a machine, a device, an appliance, an apparatus, and a system (an assembly of a plurality of devices or the like) which can be used as a power supply for driving/operating the secondary battery or a power storage source for accumulating power without any particular limitation. The magnesium-sulfur secondary battery (specifically, magnesium-sulfur secondary battery) used as a power supply may be a main power supply (power supply used preferentially) or an auxiliary power supply (power supply used in place of the main power supply, or by switching from the main power supply). In a case where the magnesium-sulfur secondary battery is used as the auxiliary power supply, the main power supply is not limited to the magnesium-sulfur secondary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A positive electrode for a magnesium-sulfur secondary battery, comprising:
   a laminated structure including a positive electrode active material layer and a carbon material layer,
   wherein the positive electrode active material layer includes sulfur or a sulfur compound,
   wherein the laminated structure is sandwiched between a first mesh layer and a second mesh layer,
   wherein the first mesh layer and the second mesh layer include a metal or a metal alloy thereof, and
   wherein the first mesh layer, the positive electrode active material layer, the carbon material layer and the second mesh layer are disposed in order.

2. The positive electrode for magnesium-sulfur secondary battery according to claim 1, wherein the carbon material layer including a graphite-based carbon material having conductivity.

3. The positive electrode for magnesium-sulfur secondary battery according to claim 1, wherein the positive electrode active material layer and the carbon material layer are pressure-bonded.

4. The positive electrode for magnesium-sulfur secondary battery according to claim 1, wherein the first mesh layer and the second mesh layer include nickel.

5. A magnesium-sulfur secondary battery comprising:
   a positive electrode including a laminated structure having a positive electrode active material layer and a carbon material layer;
   an electrolyte layer; and
   a negative electrode,
   wherein the positive electrode active material layer includes sulfur or a sulfur compound,
   wherein the laminated structure is sandwiched between a first mesh layer and a second mesh layer,
   wherein the first mesh layer and the second mesh layer include a metal or a metal alloy thereof, and
   wherein the first mesh layer, the positive electrode active material layer, the carbon material layer and the second mesh layer are disposed in order.

6. The magnesium-sulfur secondary battery according to claim 5, wherein the carbon material layer and the electrolyte layer face each other.

7. A battery pack including:
   the magnesium-sulfur secondary battery according to claim 5;
   a controller configured to perform control relating to the secondary battery; and
   an exterior housing configured to accommodate the magnesium-sulfur secondary battery.

8. An electronic device comprising the magnesium-sulfur secondary battery according to claim 5.

9. An electric vehicle comprising:
   the magnesium-sulfur secondary battery according to claim 5;
   a converter configured to receive electric power supplied from the magnesium-sulfur secondary battery and convert the electric power into a driving force of the electric vehicle; and
   a controller configured to perform information processing relating to vehicle control based on information relating to the magnesium-sulfur secondary battery.

10. A power storage comprising the magnesium-sulfur secondary battery according to claim 5,
    wherein the power storage is configured to be connected to an electronic device.

11. A method for producing a positive electrode for a magnesium-sulfur secondary battery, wherein the positive electrode includes a laminated structure including a carbon material layer and a positive electrode active material layer having sulfur or a sulfur compound, and meshes including a metal or an alloy thereof, the method comprising:
    sandwiching the laminated structure between the meshes; and
    pressure-bonding the positive electrode active material layer and the carbon material layer by applying a pressure to a whole of the meshes and the laminated structure,
    resulting in the positive electrode comprising:
    the laminated structure including the positive electrode active material layer and the carbon material layer,
    wherein the positive electrode active material layer includes sulfur or the sulfur compound,
    wherein the laminated structure is sandwiched between a first mesh layer and a second mesh layer,
    wherein the first mesh layer and the second mesh layer include the metal or the metal alloy thereof, and
    wherein the first mesh layer, the positive electrode active material layer, the carbon material layer and the second mesh layer are disposed in order.

* * * * *